UNITED STATES PATENT OFFICE.

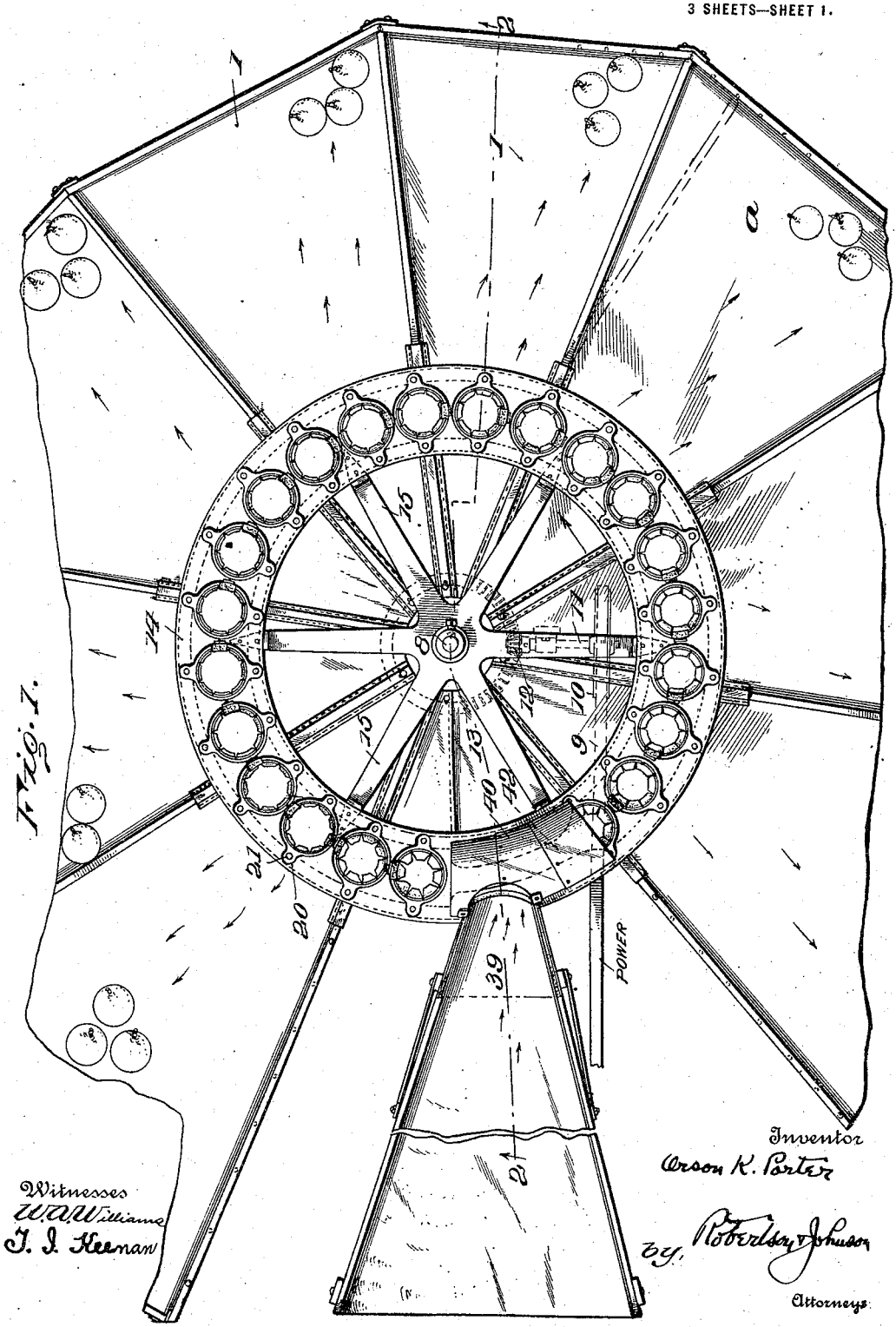

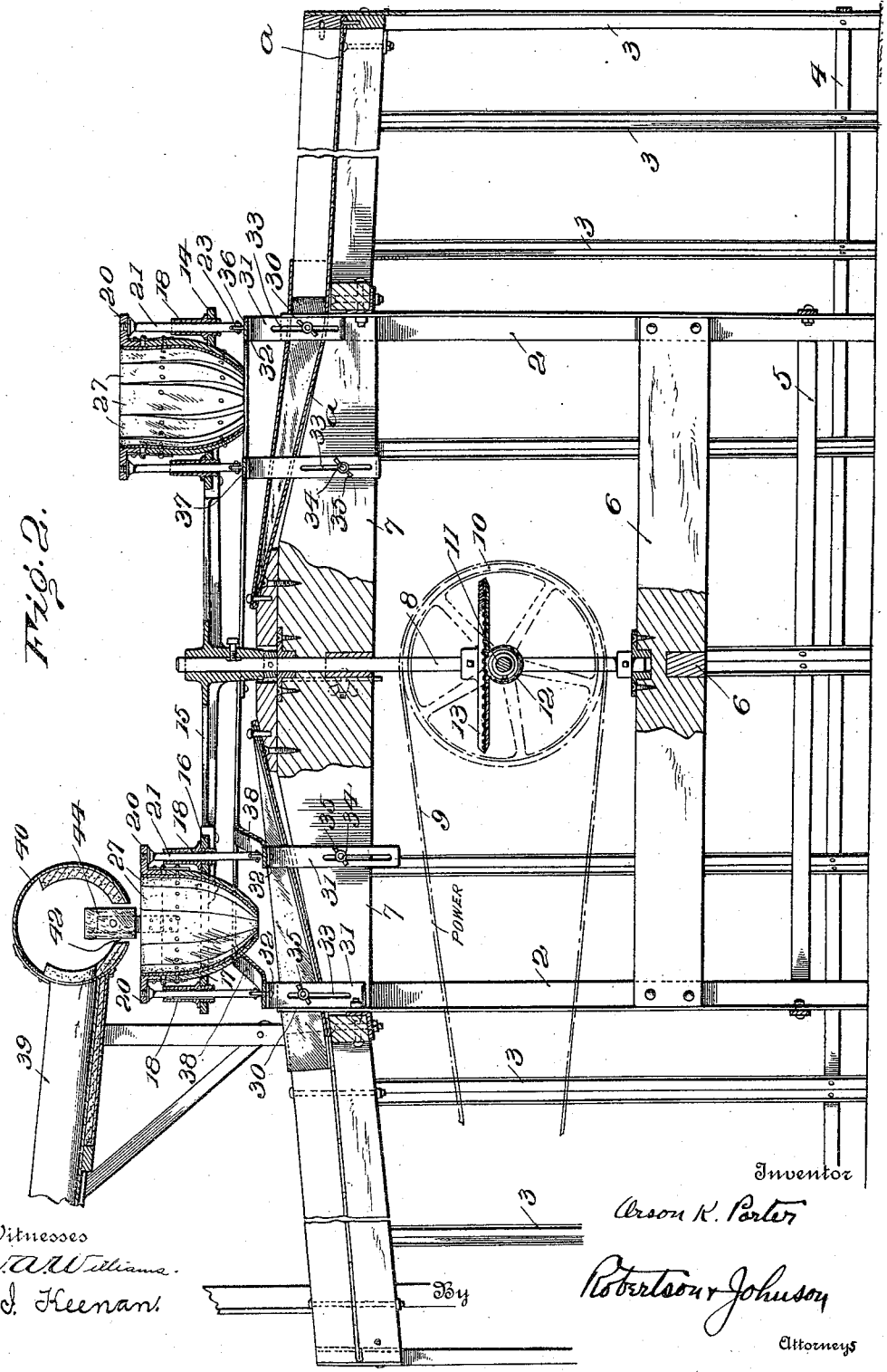

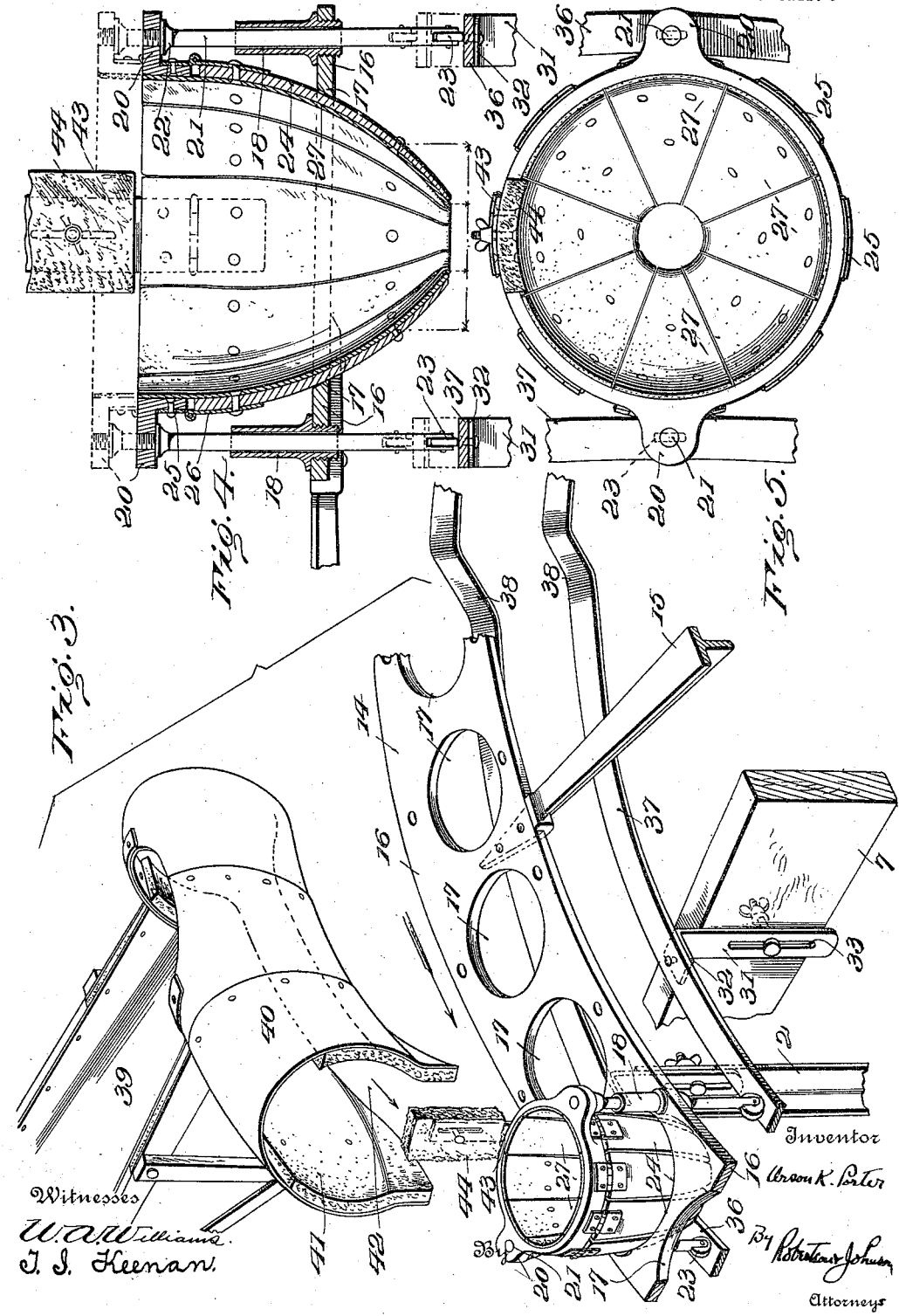

ORSON K. PORTER, OF THE DALLES, OREGON, ASSIGNOR TO OREGON FRUIT CLEANER COMPANY, OF THE DALLES, OREGON, A CORPORATION OF OREGON.

FRUIT-GRADER.

1,184,209. Specification of Letters Patent. Patented May 23, 1916.

Application filed March 20, 1913, Serial No. 755,611. Renewed April 14, 1916. Serial No. 91,260.

*To all whom it may concern:*

Be it known that I, ORSON K. PORTER, a citizen of the United States of America, and a resident of The Dalles, in the county of Wasco and State of Oregon, have invented certain new and useful Improvements in Fruit-Graders, of which the following is a specification.

My invention relates to fruit graders, and while differing in many respects from the grader of my Patent No. 1,043,249, granted November 5, 1912, has certain broad features in common therewith. Furthermore, the embodiment of my invention illustrated and described herein includes also various of the features described and claimed in my companion application Serial No. 755,610, filed of even date herewith.

The machine of the present application in common with the graders of my aforesaid patent and companion application, is provided with individual fruit holding bags or pockets movable over a series of bins from the head to the foot of the grader and having automatically variable outlets enlarged as they pass over successive bins, the fruit being delivered to the first bin at which the outlet is sufficiently large to allow it to pass through. It differs radically, however, from both the said graders, in providing gages carried with individual fruit holders having variable outlets and movable over successive bins, and also means for causing relative bodily movement between the gages and individual fruit holders to vary said outlets.

It presents various novel features hereinafter described and has the advantages of simplicity, strength, comparative absence of friction, avoidance of springs, etc.

My invention therefore consists in the matters hereinafter described and more particularly set forth in the appended claims.

Referring to the drawings: Figure 1 is a plan view of the grader, certain parts being broken away; Fig. 2 is a vertical section on the line 2—2 of Fig. 1; Fig. 3 is a detail perspective view illustrating the mode of feeding fruit from the elbow spout to one of the individual fruit holders; Fig. 4 is a central vertical section through one of said fruit holders and adjacent parts; Fig. 5 is a plan view corresponding to Fig. 4.

It is obvious that my invention may be embodied in a machine in which the bins are arranged in a straight line instead of in a circle, but I prefer the more compact circular form. In using the term bin I intend to include any means for receiving the graded fruit and keeping the grades separate, as floor space, belts, receptacles of various kinds, etc.

The general form of the machine and the construction of the bins being that illustrated and described in my said companion application need not be described in detail here. It is sufficient to say that the bins 1 having a canvas flooring $a$ are supported by inner and outer legs 2 and 3 respectively and that suitable braces 4 and 5 are employed along with additional cross framing 6 and 7 in which is rotatably supported an upright shaft 8 driven by a belt 9 through pulley 10 fast on a shaft 11 rotatably mounted in the framing, the small bevel gear 12 fast thereto and the large bevel gear 13 fast to the shaft 8. Rotatable with the shaft 11 and fast thereto is the gage frame 14 which in the simple form illustrated herein is an annular band supported by the spokes 15 and provided with gage holes 16 which preferably have beveled edges 17 at each side of which are located in radial lines sleeves or bushings 18 through which the supports for the individual fruit holders may move up and down.

The fruit holding bags or pockets are provided at their tops with rings 19 having lugs 20 in which are secured upright legs or supports 21 which as shown in Fig. 4 may be provided with collars 22 and may be screwed into holes in the lugs 20. These supports are provided at their lower ends with anti-friction rollers 23 for coaction with cam tracks to be hereinafter described. The supports which as stated pass up through the sleeves or bushings 18 constitute with the rings 19 supporting frames for the fruit holders. These fruit holders are made up of a number of separate sections 24 which project down through the holders 16 which are of uniform size. The sections 24 are hinged to or hung from the said rings 19 so that by their own weight and that of the fruit they tend to swing outward around the point of hinging or suspension so that the opening at the bottom of the fruit holder is variable in size. In the embodiment illustrated, I have shown the sections as rigid and as connected at their upper ends by hinges 25—26 to the rings 19, but they might be made of flexible material hung or hinged to the rings 19 or of spring metal riveted to the said rings, somewhat as in my companion application. This arrangement would, however, unnecessarily increase the friction and might necessitate the provision of means for positively returning the fruit holders to closed position. It will be noted that the bags or pockets as shown in Fig. 4 have the adjacent edges of their sections 24 in contact but it is not necessary that this be the case even when the holders are in what might be called the closed position, that is, the position in which the outlet is at its smallest. It is true also that narrower strips or sections might be used. The interior of the holders is clothed with soft material as canvas or wool felt as indicated at 27, this clothing being preferably both glued and riveted. The construction is such that whatever the size of the outlet its shape is always circular, which has been found to be the best if not the only practicable shape. It will be obvious from the description already given that the size of the outlet opening depends on the relative position of the fruit holder and the gage 14, the outlet being smallest when the ring 19 and the gage 14 are nearest together and largest when they are farthest apart. The means for producing this relative movement will now be described but it is to be borne in mind that while the arrangement illustrated seems the simplest it would be possible to move the gage, keeping the fruit holder stationary, or to move both the gage and the fruit holder.

Certain of the inner legs 2 are extended up beyond the cross framing 7 and the top of the bins as indicated at 30 and support brackets having vertical legs 31 and horizontal members 32. These brackets are adjustably mounted by means of slots 33 in the vertical legs 31 through which projects the bolt 34 provided with the wing nut 35. Corresponding brackets to which I have applied the same reference characters are adjustably supported on the cross framing 7, these brackets being nearer the center than the first and the brackets being arranged in pairs of an inner and an outer bracket arranged on radial lines. The function of these brackets is to support a pair of cam rails 36—37, which, as the construction is illustrated, are permanently secured to the members 32 of the brackets so that the whole of each rail may be adjusted at once. It is obvious however, that each cam rail might be composed of individually adjustable sections. The cam rails are lowest just back of the head of the grader and, as they extend forward toward the foot of the machine, rise either in a continuous gradual incline or they may be arranged in sections corresponding to successive bins each section being a little higher than the section next preceding it, until the foot of the grader is reached when there is a comparatively sudden drop 38. The cam rails 36—37 correspond so that they have the same effect upon both sides of the fruit holders, the rollers 23 of whose supports 21 run on them as the frame 14 is rotated in the operation of the machine, the result being the gradual raising of the fruit holding bags or pockets with reference to the frame 14 as it passes over successive bins from the head to the foot of the grader.

The means for feeding fruit to the grader is that illustrated, described, and claimed in my aforesaid companion application. It consists of an elbow spout 39—40 clothed with soft material 41 and having in its bottom a slot 42, the said bottom being gradually curved from a substantially horizontal plane to a substantially vertical plane. This slot lies in the arc of the circle of which the axis of the machine is the center and in which the centers of the rings 19 of the individual fruit holders lie. Each fruit holder carries a feed stub 43 for passage through said slot, said stub being provided with clothing 44.

The operation of the machine may be briefly described as follows: The gage 14 carrying with it the individual fruit holding bags or pockets is rotated, the holders being moved over successive bins from the head to the foot of the grader, the feed stub 42 feeding fruit from the elbow spout 39—40 into the corresponding holder which then carries the same to a point at which the outlet of the holder has enlarged sufficiently, by reason of the upward movement of the holder caused by the passage of its supports over the cam rails, to release the fruit, the holder then passing over the remaining bins and the outlet continuing to open wider until just before the head of the machine is reached, at which time the sudden drops 38 of the cam rails permit the holders to drop the gage compelling the sections 24 of the holder to return to closed position in time for the next cycle of operations.

The gages have been illustrated as combined into a unitary structure, but the individual gages might, if desired, be separate and separately movable. As the gage frame is really a series of gages so each cam rail, even if continuous, is a series of cams. It will be apparent that the depending sections of the fruit holders are overbalanced outwardly.

What I claim as my invention is:

1. A fruit grader comprising in combination, a series of bins, individual fruit holders having variable outlets, a gage frame having gaging and guiding means for said holders, and means for simultaneously moving said frame and holders over said bins from the head to the foot of the grader, and a cam track for supporting said holders and for raising and lowering them with respect to said gage frame as they move with the gage frame.

2. A fruit grader comprising in combination, a gage frame having gage holes, individual fruit holding bags or pockets carried by said gage frame and having freely movable sections depending through said gage holes and contacting with the edges thereof, and cams for raising and lowering said individual fruit holding bags or pockets with respect to said gage frame to permit the sections to move outward to increase the outlet opening and forcing them to move inward to decrease it.

3. A fruit grader comprising in combination, a series of bins, a gage frame having a series of gage holes of uniform size, a plurality of individual fruit holding bags or pockets each provided with supporting legs passing through said gage frame at opposite sides of a gage hole, said holders being provided with a series of sections hinged at the top, depending freely through said gage holes and contacting with the edges thereof, and supporting cam rails for cooperating with the ends of the supporting legs to raise the fruit holders as they pass over successive bins to increase the outlet opening and to lower them to decrease it before the head of the grader is reached.

4. A fruit grader comprising in combination, a series of bins, a gage frame having a series of gage holes, upright fruit holders movable with said gage frame and having a series of inwardly and outwardly movable sections depending through said gage holes contacting with the edges thereof and providing automatically variable outlets, means for moving said gage frame and fruit holders over successive bins, cam operated means for raising said fruit holders as they pass over successive bins and for lowering them, and guides carried by said gages for maintaining the fruit holders upright and guiding their up and down movement.

5. A fruit grader comprising in combination, a series of bins, a gage frame having a series of alined gage holes, and a pair of guide holes adjacent each gage hole and in line with the axis thereof, upright fruit holders having a top ring of greater diameter than said gage holes and a pair of upright legs secured to said ring and passing through said guide holes, said holders being also provided with a series of movable sections hung on said top ring depending freely through said gage holes and contacting with the edges thereof, cam rails supporting said legs, and means for moving said gage frame and upright fruit holders over successive bins from the head to the foot of the grader, the cam rails raising the holders with reference to the gage frame to permit the automatic enlargement of the outlet of the fruit holders during this movement and returning them into the original position.

6. A fruit grader comprising in combination, a series of bins, a gage frame having a plurality of gage holes of uniform size and a pair of tubular guides or bushings at the side of each of said holes, upright fruit holders having frames provided with legs depending through said tubular guides or bushings and with a series of inwardly and outwardly movable sections secured to said frame extending inwardly and depending freely through said gage holes to provide automatically variable outlets for the fruit holders, a pair of cam rails coacting with said legs thus supporting said fruit holders, and means for moving said gage frame and fruit holders over successive bins from the head to the foot of the grader, said cam rails gradually raising said holders to permit the successive enlargement of the outlets of the fruit holders as they pass over successive bins and returning them to their original position.

7. A fruit grader comprising in combination, a series of bins, a gage frame having round gage holes of uniform size provided with downwardly and inwardly beveled edges, individual fruit holding bags or pockets having top rings of greater diameter than said gage holes and a plurality of curved sections hinged to said ring depending freely through said holes and overbalanced outwardly, means for moving said gage frame and holders over the successive bins from the head to the foot of the grader, and stationary cams coacting with said individual fruit holding bags or pockets to raise and lower them to gradually enlarge the outlet opening as the holders are moved over the successive bins.

8. A fruit grader comprising in combination, a series of bins, a gage frame provided with gage holes of uniform size and with guide holes at opposite sides of each gage hole, individual fruit holders having top rings supported by legs passing down through said guide holes, antifriction rollers on the ends of said legs, a pair of cam rails for coaction with said rollers, and means for moving said gage frame with the individual fruit holders over successive bins from the head to the foot of the grader, said cam rails acting to raise and lower the fruit holders with respect to the gage frame during this movement.

9. A fruit grader comprising in combination, an upright shaft, a series of bins around said shaft, gages and individual fruit holders arranged in pairs in a circle around said shaft, said gages having gage holes and said fruit holders being automatically expansible and depending through said gage holes, operative connections between said pairs of gages and holders and the shaft, means for rotating the shaft to carry the holders and gages over successive bins, and stationary cams coacting with a member of each pair to move said member bodily with respect to the other to permit the expansion of the individual fruit holder.

10. A fruit grader comprising in combination, an upright shaft, gages and individual fruit holders arranged in pairs in a circle around said shaft, said gages having gage holes and said fruit holders having depending inwardly projecting sections depending through said holes hinged at the top of the holder but otherwise free therefrom and overbalanced outwardly, operative connections between said pairs of gages and holders and the shaft, means for rotating the shaft to give travel to the holders and gages, and stationary cams co-acting with a member of each pair to move said member bodily with respect to the other as they travel to permit the expansion of the individual fruit holders.

11. A fruit grader comprising in combination, a vertical shaft, an annular gage frame having gage holes and secured to said shaft for rotation therewith, a plurality of fruit holders having movable sections depending freely through said gage holes, means for rotating said shaft with said gage frame and individual fruit holders, and cam operated means for raising and lowering said holders as they move with the gage frame.

12. A fruit grader comprising in combination, a central upright shaft, a series of radial bins around said shaft, an annular gage frame over said bins mounted for rotation with said shaft, means for rotating said shaft, automatically expansible individual fruit holders depending through said gage frame having variable outlets and carried with said annular gage frame, and a pair of circular cam rails for co-action with said fruit holders to raise the same as the support passes over successive bins and to lower it.

13. A fruit grader comprising in combination, an upright shaft, a series of bins around said shaft, an annular gage frame mounted for rotation with said shaft, and having a series of round gage holes of uniform size having their axes in a circle around the said shaft and provided also with a pair of guide holes lying in radial planes through said axes, individual fruit holders having movable sections depending through said gage holes and having supporting legs passing through the guide holes, means for rotating said shaft and with it said gage frame and fruit holders, and cam rails coacting with said legs to raise and lower the fruit holders with reference to the gage frame during their joint rotation.

14. An individual fruit holder for fruit graders having a top ring and a series of depending inwardly extending sections curved both crosswise and lengthwise and hinged on said ring but otherwise free and overbalanced outwardly.

In testimony whereof I affix my signature in presence of two witnesses.

ORSON K. PORTER.

Witnesses:
 JOHN L. FLETCHER,
 T. I. KEENAN.

Copies of this patent may be obtained for five cents each, by addressing the "Commissioner of Patents, Washington, D. C."